United States Patent Office 3,287,476
Patented Nov. 22, 1966

3,287,476
CERAMIC PRODUCT AND PROCESS
Francis H. Snyder, Newtown, Conn., assignor, by mesne assignments, to Tredco, Ltd., Houston, Tex., a limited partnership of Texas
No Drawing. Filed Mar. 10, 1961, Ser. No. 94,673
2 Claims. (Cl. 264—36)

This invention relates to the improvement of ceramic clay with vitreous glass-fibers.

The addition of relatively small quantities of short glass i.e. vitreous fibers to clay intended for ceramic use brings about a number of significant improvements. During the drying of the green ware it materially improves the control over shrinkage and especially, the more serious consequences of shrinkage; warping, cracking and breakage. The strength of both the dry, unfired ware and of the finished ware is so materially enhanced as to significantly alter existing practices in the industry. A number of other advantages to be derived from the practice of the invention will be pointed out as the description proceeds.

The invention is generally applicable to substantially the entire ceramic industry. Improvement of the cheaper clay products is most pronounced; although the improvement in pottery and stoneware in less notable, the economic advantages are much greater; still less but significant advantages are found with the porcelain type clays.

Many clay compositions for ceramic purposes are formed by the admixture of several ingredients, for example, feldspar, raw or processed clays from several sources. It has also been proposed to incorporate into such clay, finely divided glass, for example, purified waste from the polishing of plate glass. Such added glass appears to directly affect the chemical character of the final ceramic composition, the physical properties being changed indirectly. While some chemical properties of the finished object produced by my invention are frequently improved substantially, the amount of glass necessary to attain the objectives of my invention is relatively much smaller than that taught by the previously mentioned prior art, consequently the chemical properties are scarcely altered in my preferred operating range.

According to my invention, fine staple glass fiber is carefully dispersed throughout any of the conventional clay masses. A suitable glass fiber is general purpose glass No. 475 made by the Libbey-Owens Ford Glass Company. This is described as a boro-silicate glass having a softening point of 1280° F. A preferred grade is one having a range of 0.0001 to 0.00015 inch in diameter and 0.25 to 0.75 inch long. This gives an average length:diameter ratio of 4,000:1. Optimum improvement appears to be attainable in the range of 0.5 to 2.0 percent by weight of the dry clay but significant improvement is shown with lesser amounts while the upper limit appears to be largely dictated by cost. The resulting fibered clay with suitable water content may be formed by pressing, on the wheel, by slip casting or any other conventional method. The fibered clay also has unusual qualities for repairing cracked and broken ware, as will be pointed out subsequently. Green ware may be dried more efficiently when made from fibered clay and important advantages are also to be had in the firing.

The invention may be more readily understood by reference to the series of examples that follow:

Glass fiber staple (L.O.F. No. 14), 4 pounds, is immersed in 80 pounds water containing a suitable deflocculating such as sodium metasilicate (0.02 to 0.04 percent). The fiber mass is then pressed, expelling about 60 pounds of water. The mass of fiber is picked apart and added to 200 pounds of clay in a pug mill to obtain complete distribution of the fibers through the clay. The plastic mass is mixed with an additional 40 pounds of water in a blunger. This gives a moderately viscous slip containing:

| | Percent |
|---|---|
| Clay | 61.73 |
| Glass fiber | 1.23 |
| Water | 37.0 |

On a dry basis this amounts to 2 percent glass fiber in clay, somewhat more than is needed for most purposes. However, it is important to obtain satisfactory distribution of the glass fibers throughout the clay and the foregoing method is a convenient one for preparing a master batch.

A plastic clay body suitable for throwing on a potter's wheel, for press-molding or jiggering, is prepared from the product of the preceding paragraph as follows: In a kneader or pug mill, there are mixed, with continuous proportionate feeding:

| | Pounds |
|---|---|
| Glass fiber slip (2% glass) | 324 |
| Dry clay | 400 |
| Water | 66 |
| Total | 790 |

On a dry basis, this product contains approximately 0.66 percent glass fiber. The purpose of employing continuous proportionate feeding rather than batch mixing is to obtain uniform, intimate mixture with low mechanical handling of the glass fiber. Although most glass fiber now commercially available, can be handled extensively without excessive fiber breakage, it is obviously desirable to obtain intimate mixture of the fiber with the clay, using as little mechanical working as possible.

The dry clay employed was obtained from the Stewart Clay Company of New York under the name "Jordan." Each clay or clay mixture has its own individual characteristics; this one is deemed representative. The admixture described immediately above may be considered slightly soft for throwing by some operators. By reducing the amount of water from 66 pounds to 60 pounds, a clay of stiffer body is obtained. As is well known in the art, different clays and different operations call for adjustment of the consistency of the clay with more or less water.

For casting slips, additional water is required. Slip casting is done by pouring the slip into dry plaster molds. The plaster absorbs water leaving the piece sufficiently dry to handle, shrunk away from the mold surface. To facilitate casting and to increase the rate of water removal, it is customary to treat the slip with formic or acetic acid in sufficient quantity to adjust the pH to a range of 5.0 to 6.5. This brings about partial reflocculation and may require the addition of more water but, on production basis, time is saved. As is well known in the art, the pH of throwing clays may also be adjusted.

In the claims, reference to a raw ceramic composition including clay, means a clay being prepared for subsequent shaping, as by throwing on a potter's wheel or slip casting together with such modifying agents as are common in the prior art.

Shrinkage and warpage of clay products takes place during drying and again during firing. Shrinkage may be anticipated by making the moist clay article sufficiently larger than the desired dimensions but it is impossible to adequately anticipate the extent or direction of warpage, particularly during the drying of the green clay ceramic ware. It is also possible to reduce warpage by careful control of the temperature and humidity conditions of the drying atmosphere along with the rate of moisture removal. However utilization of these expedients adds materially to costs by reason of the large quantity of work being held in process together with the large amount of space taken up by the ware during the extended drying.

Alternatively, some simpler shapes may hold under constraint during drying. Thin flat objects such as tile may be confined between plaster batts or boards to hold them flat. However, the same clay body with the addition of 0.5 to 1.0 percent glass fiber may be rapidly dried at temperatures up to 250° F. without warping, provided only that both flat sides are exposed equally to drying conditions.

The addition of glass fibers brings about a moderate reduction in shrinkage during drying, most notable in the direction of fiber orientation. In cast, pressed or jiggered ware, the fibers tend to line up in planes parallel to the mold surfaces. When relatively thin slips are employed, the extent of such lamellar orientation is accentuated. This tends to force the clay to shrink more in the thickness direction rather than the directions parallel to the mold surfaces.

Shrinkage during firing may be attributed to several factors including:

(a) Loss of water of hydration.

(b) Transition of quartz from alpha to beta crystal structure.

(c) Vitrification whereby particles are drawn closer together by incipient fusion.

At least the first of these processes will take place before the melting point of the glass fibers is reached and generally, the second will also. It is natural that the melting point of the glass fibers will be lower than the majority of the constituents of the clay. However, the small amount and extensive distribution of the fiber, as is contemplated in the preferred embodiment of my invention, eliminate any significance of the glass upon the body during firing. If larger amounts of glass fiber are employed, the effect during firing is governed by its behavior as glass rather than its behavior as fiber.

It has generally been considered that extended handling of dry green ceramics was impossible due to the extreme fragility of the ware. If it was desired to change the dimensions of such objects, it had to be limited, as by moistening the surface and scraping the moistened area. It was also known to fire the ware at a lower temperature than that which was finally contemplated, after which the partially fired ware could be worked using relatively expensive tools of the type normally adapted to work hard, vitreous substances.

Utilizing the teachings of my invention, dried green ware may be worked with any of the tools conventionally employed for wood-working such as knives, saws, planes and drills. It can be turned on a lathe adapted for turning wood. As the clay is no longer subject to plastic flow, much more precise finishing or decorative tooling can be carried out. The possibility of being able to work dried clay objects with simple hand tools opens up whole new techniques of expression and execution, especially in the fields of art and science.

Very little serious consideration has heretofore been given to the repair of ceramic ware. What repair work has taken place has been essentially limited to green ware. The repair of fired ware has been a matter of theoretical consideration or laboratory investigation. Utilizing glass fiber-clay formulations, both operations have proved successful.

By way of example, a tray about 13 inches long, made from clay to which no glass fiber was added, developed a longitudinal split in the bottom, 9 inches long and ¼ inch wide at the widest point. After thorough drying, the crack was enlarged at the ends so that a slot of substantially uniform width resulted. A lump of clay containing one percent glass fiber was worked into a thin strip having the fibers oriented axially. Small pieces of the strip were laid across the slot so that the fibers were predominately at right angles to the edge of the slot. The pieces were worked carefully into the slot filling it as completely as possible with a slight excess above the face of the object. After the drying, the process was repeated, healing such small cracks as had developed during the operation. After redrying, the bead of repair clay was smoothed off flush with the surface of the tray. The piece was then fired, glazed and refired without difficulty. The article showed no evidence of repair.

A fired and glazed stoneware pitcher 9 by 6 inches was deliberately dropped, breaking into eight pieces. The broken edges were moistened with a clear, low-fire glaze-slip. A thin strip of clay having 1 percent glass, was laid upon each broken edge and the pieces pressed tightly together. After drying, the excess clay was rubbed off and the article given a light spray coat of the original glaze. The pitcher was then refired at cone 9. The repair lines can be discovered by careful examination but would not be noticed unless attention were drawn to them.

During the bisque firing of a small pitcher, the handle fell off. A new handle was made of glass containing clay and attached wet to the pitcher with thin slip made of glass containing clay. The handle was allowed to dry, the pitcher glazed and fired at cone 5. The repair was completely successful.

Using a representative commercial pottery clay, in wide use, without and with the addition of substantially 1 percent glass fiber, the flexural strength was tested upon rods of ½ inch diameter, over a 2½ inch span. The average of several specimens upon dried green clay produced comparative values of 285 and 541 p.s.i. After firing under recommended conditions, the comparative values were 1,183 and 3,887.

In view of such important increases in strength, utilization of my invention makes possible the redesign of many ceramic articles with great saving of weight and corresponding savings of material. Also, many articles will become much more attractive in appearance. Additional savings result from the reduction in breakage losses and it must also be pointed out that unit productivity of the kilns will be increased because of the reduced weight of the ware.

In its broadest aspects, my invention has notable scope being generally applicable to ceramic products that are fired in one of the ultimate stages of treatment. Economic considerations may limit the applicability of the invention where cheaper clays are involved but this may be partially overcome by resort to cheaper types of vitreous fiber. Obviously, chemical compatibility between the glass and the clay must be considered but this is a less serious matter than might be supposed from an initial observation because such a small amount of glass is required for effective results and because the individual fibers are fine and widely scattered, according to the best practice of the invention. It is obvious that, according to the particular characteristics of the vitreous fiber and the clay, many suitable treatments may be devised for achieving wide dispersal of the fibers throughout the clay. Similarly, under favorable circumstances, no special treatment at all will be required.

As previously pointed out, my preferred proportion of glass fiber to clay is from ½ to 1 percent on a dry weight basis but the successful operating ratios are much more extensive. Appreciable results are still observable with only 0.2 percent of glass fiber; larger amounts than 2.0 percent may be used even though they do not seem to add especially to the results obtained with lesser amounts. In preparing master batches, 5 percent or more of glass may be employed.

Excellent results have been obtained in the use of fine fibers ranging in length from 1 inch downwardly. Coarser fibers somewhat greater in length can be dealt with but fibers in the range of satisfactory diameters, tend to become entangled and knotted when used in lengths greater than 2 inches. However, a limited amount of this can be tolerated especially since these conditions tend to correct themselves through fiber breakage taking place during the handling of the clay in which the glass fiber is distributed. Excessive intensive manipulation of the clay reduces the benefits of the glass content by shortening the fiber length. It is also apparent that the analysis of the specific glass fiber is significant, since some types break much more easily than others.

It is to be pointed out that each of the measurable factors connected with my invention is a relative one, some improvements may be noticed outside of the preferred ratios indicated but this is inherent from the wide range of chemical and physical properties possessed by the two particular ingredients in the composition of my invention. Also, because significant improvement is noticeable over a relatively broad range of composition, it is inherently necessary to define my invention in relative terms.

I claim:

1. The method of repairing discontinuities in ceramic ware which comprises applying to the opening between the two portions of the article to be repaired a quantity of moist compatible clay, said clay having intimately distributed within its body, a small amount of glass fiber staple, firmly pressing said clay into intimate contact with the portions to which its applied, drying the assembly and firing it.

2. The method of claim 1 wherein the clay used for repair has a substantial proportion of the glass fibers therein oriented uniformly and wherein the repair material is applied with the oriented fibers substantially at right angles to the surfaces of the portions connected.

References Cited by the Examiner

UNITED STATES PATENTS

| 950,954 | 3/1910 | Powers | 25—156 |
| 2,533,899 | 12/1950 | Ryner | 106—50 |
| 3,062,670 | 11/1962 | Marzocchi et al. | 106—99 |
| 3,069,773 | 12/1962 | Saffir | 106—50 |

FOREIGN PATENTS

| 370,950 | 4/1932 | Great Britain. |
| 410,611 | 5/1934 | Great Britain. |

TOBIAS E. LEVOW, *Primary Examiner.*

JOSEPH REBOLD, JOHN H. MACK, J. POER,
*Assistant Examiners.*